W. E. LAWSON AND W. R. SMITH.
BOTTLE WARMER AND STERILIZER.
APPLICATION FILED SEPT. 5, 1919.
1,354,409.
Patented Sept. 28, 1920.
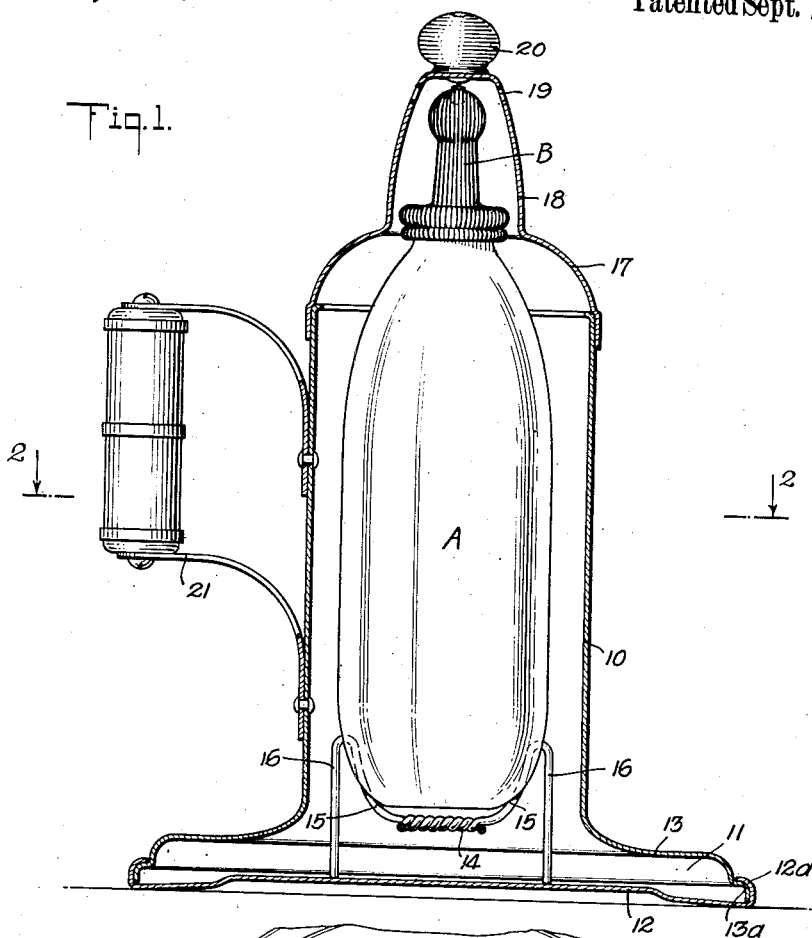
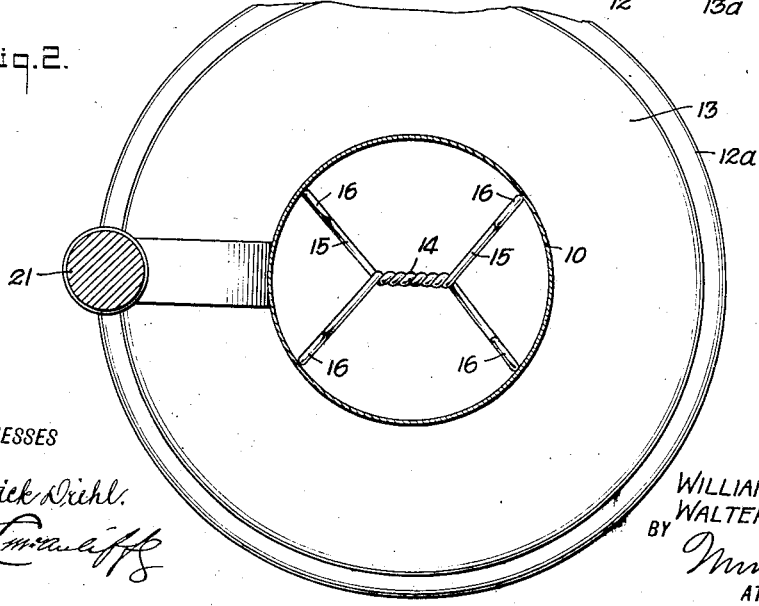
WITNESSES
INVENTORS
WILLIAM E. LAWSON
WALTER R. SMITH
BY
ATTORNEYS

UNITED STATES PATENT OFFICE.

WILLIAM EARL LAWSON, OF RAHWAY, AND WALTER RULON SMITH, OF WESTFIELD, NEW JERSEY.

BOTTLE WARMER AND STERILIZER.

1,354,409.  Specification of Letters Patent.  Patented Sept. 28, 1920.

Application filed September 5, 1919. Serial No. 321,988.

*To all whom it may concern:*

Be it known that we, WILLIAM E. LAWSON and WALTER RULON SMITH, citizens of the United States, and residents, respectively, of Rahway, in the county of Union and State of New Jersey, and Westfield, in the county of Union and State of New Jersey, have invented a new and Improved Bottle Warmer and Sterilizer, of which the following is a description.

Our invention relates to means for warming bottles and more particularly relates to a warmer for nursing bottles and consisting of a container presenting a body and a broadened bottom portion, said bottom portion being adapted to hold a quantity of water and the container being adapted to receive the bottle to be warmed by steam generated by the heating of the water.

Objects of the invention are to provide for supporting the bottle in the warmer without contact with the bottom of the warmer, thereby avoiding danger of the bottle cracking under the severe heat; to support the bottle out of contact with the sides of the warmer, thereby preventing breaking of the bottle by unequal heating of points at the sides of the bottle; to so support the bottle that ample steam space is provided between the sides thereof and the walls of the warmer, thereby avoiding quick condensation of the steam and thus effecting a quick heating of the bottle and its contents; to provide a supporting device which will have direct support on the bottom and will be positioned by the body of the warmer for centering the bottle and maintaining it out of contact with said body; to provide a supporting and centering device that may be readily removed from the bottle warmer for substituting one of a different height, thereby adapting the warmer to bottles of various sizes; to provide a broadened bottom on the warmer so formed as to possess strength and durability and involving the minimum number of members; to provide a bottle warmer of the indicated character so formed that the bottle will be effectively heated by steam rising from the water in the bottom and without contact with the water, thereby lessening the possibility of overheating the bottle and the milk therein; and to provide a warmer having the top thereof arranged to accommodate and to effect the sterilization of the nipple of a milk bottle with the heating and sterilizing of the bottle.

The stated objects are attained by a novel construction and arrangement of parts hereinafter more particularly described and defined in the claims.

Reference is to be had to the accompanying drawings forming a part of this specification, it being understood that the drawings are merely illustrative of one example of the invention.

Figure 1 is a vertical section of a bottle warmer embodying our invention and showing in side elevation a nursing bottle supported therein;

Fig. 2 is a horizontal section on the line 2—2, Fig. 1.

In carrying out our invention in accordance with the illustrated example, the warmer is formed with an upright tubular body 10 having a broadened bottom portion 11 which is formed by a separate bottom plate or disk 12 and an integral outwardly directed flange 13 on the lower end of the body 10, the outer edge 13ª of said flange 13 being carried downwardly and forming a seam with the upwardly and inwardly turned flange 12ª at the edge of the bottom plate 12, the described formation of the form having the merit of simplicity and possessing strength by reason of edge portion 13ª firmly sustaining the flange 13 spaced from bottom 12; and the construction involves the minimum number of parts and the minimum number of operations in the manufacture of the warmer.

Within the warmer 10 is a removable support 14 adapted to receive the lower end of a nursing bottle A or the like, said support comprising a depressed rest 15 conforming generally to the conformation at the bottom of the bottle A and having downturned legs 16 preferably 4 in number as shown, said legs being adapted to lie against and advantageously to frictionally engage for their major portion the walls of the tubular body 10, said legs extending below the bottle rest 15 and having support at their lower ends on the bottom plate 12 thus elevating the rest 15 above the bottom plate to prevent the bottle from contact with the bottom plate and being subjected to a severe degree of direct heat and at the same time serving to center the bottle in the tubular body 10. The support 14 is by the described arrangement removably sustained in the warmer and in practice supports are provided of varying heights to accommodate bottles of different sizes.

A cap 17 quickly and detachably fits at its lower edge on the top of the body 10 and advantageously is in general of dome-shape. At the center the cap 17 is formed with a top member 18 of a diameter and rising to a height to accommodate the nipple B of the bottle without contact of the latter with the walls of said top member, thereby providing a steam space outside of the complete surface of the nipple. Near the upper end the top member 18 preferably is formed with an orifice or orifices 19 for the escape of steam for relief of the steam pressure and also, advantageously, the lifting knob 20 may be secured to the top member 18 for the convenient lifting of the cap. A suitable handle 21 is provided on the side of the body 10.

In practice, with the described construction, a small quantity of water is supplied to the warmer so that the level of the water will be below the bottom of the bottle. The broad area presented by the bottom will result in steam being generated almost instantly by the application of heat to the under side of the bottom and the steam will freely rise in the tubular body 10 and its cap 17 to surround the bottle A and the nipple B at all sides so that the contents of the bottle will be quickly warmed and the bottle and the nipple effectively sterilized. The support 14 maintains the bottle above out of possible contact with the bottom of the walls and out of direct contact with the water. Also, the support of the bottle is such that ample space is provided between the bottle and walls of the body and cap. The bottle contacts at no point with the sides of the body so that heating of the bottle is uniform, uneven heating of different points being thus positively prevented and the danger of breakage from that cause thereby avoided.

Having thus described our invention, we claim:

1. A bottle warmer including a tubular body and a broadened water holding bottom portion, said bottom portion consisting of a separate bottom plate and an integral outwardly directed annular flange on the lower end of said body and spaced from said plate, said bottom plate having an upwardly directed edge portion and said flange having a depending edge portion extending to the bottom plate for sustaining said flange spaced from said plate while affording rigid support for said flange, said edge portion of the bottom plate being turned over said depending edge portion.

2. A bottle warmer including a container having a tubular body flanged laterally at its lower end to present an increased diameter, and a relatively small diameter for its major portion above said flange, the bottom of said container being below and spaced from said body portion of relatively small diameter, and a bottle-holding device in said container at the lower end, said holding device having support on said bottom and having members contacting with the interior of the container at said portion of relatively small diameter to center the holder and the bottle held thereby in said body.

3. A bottle warmer including a container having a tubular body flanged laterally at its lower end to present an increased diameter and a relatively small diameter for its major portion above said flange, said container presenting a bottom below and spaced from said portion of relatively small diameter; together with a bottle holder removably held in the container at the lower end and presenting a bottle rest, said holder having members below said bottle rest and supported on said bottom and having centering members at the sides thereof frictionally engaging the tubular body at its said portion of relatively small diameter.

4. A bottle warmer of the class described having an elongated tubular body flanged laterally at its lower end to present an increased diameter and a relatively small diameter for its major portion above said flanged end, said body presenting a bottom below and spaced from said portion of said relatively small diameter; together with a bottle holder in the container, said holder having a bottle rest spaced from said bottom to sustain the bottle above and out of contact with said bottom, and means on said holder engaging the tubular body at its said portion of relatively small diameter to center the holder and space the sides of the held bottle at all points from said body to be out of contact therewith.

5. A bottle warmer including a container presenting a tubular body and adapted to receive water to be converted into steam by the application of heat to the container, a detachable cap on said body, and means in said container at the bottom to hold a nursing bottle and center the same in the body as well as center the top of the bottle with the usual nipple thereof in the cap, said cap having dimensions to accommodate the bottle nipple spaced from said cap to provide a steam space so that the nipple will be sterilized with the heating of the bottle.

6. A bottle warmer including a container presenting a tubular body and adapted to receive water to be converted into steam by the application of heat to the container, a detachable cap on said body, and means in said container at the bottom to hold a nursing bottle and center the same in the body, said cap having dimensions to accommodate the usual nipple of the nursing bottle spaced from said cap to provide a steam space so that the nipple will be sterilized with the heating of the bottle, said cap furthermore having a steam outlet therefrom.

WILLIAM EARL LAWSON.
WALTER RULON SMITH.